May 30, 1933. H. P. CHANDLER 1,912,177
WIRE CONNECTER
Filed Nov. 11, 1932
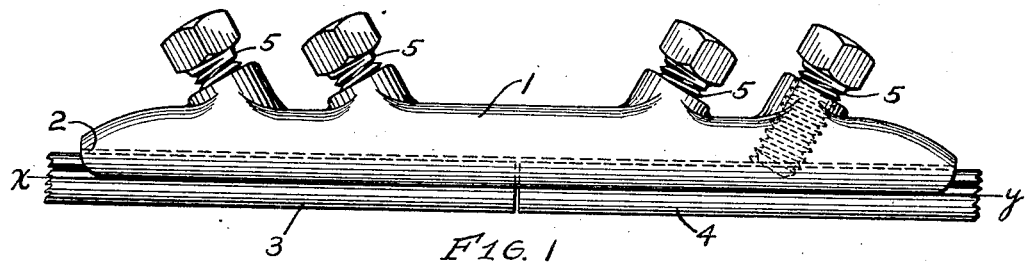
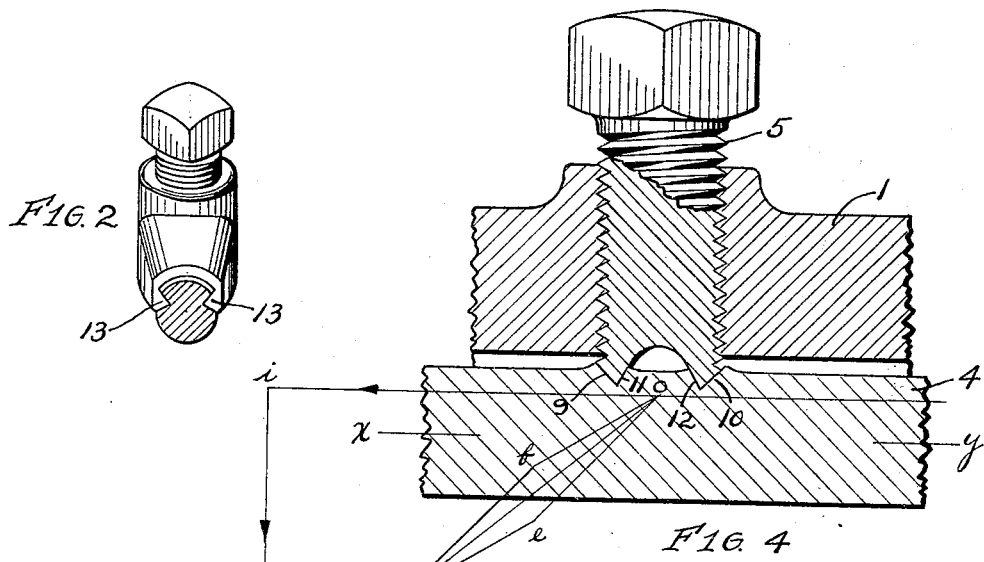
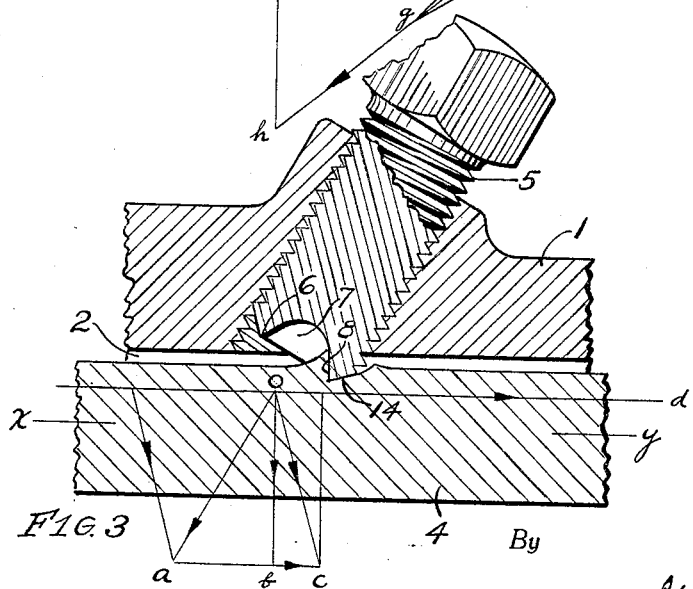
Inventor
HOMER P. CHANDLER
Attorney Patented May 30, 1933

1,912,177

UNITED STATES PATENT OFFICE

HOMER P. CHANDLER, OF MANSFIELD, OHIO, ASSIGNOR TO THE OHIO BRASS COMPANY, OF MANSFIELD, OHIO, A CORPORATION OF OHIO

WIRE CONNECTER

Application filed November 11, 1932. Serial No. 642,217.

My invention relates to connecters for conductors and is especially adapted for connecting trolley wires of a shape other than of circular cross section and known as figure 8 and grooved wire.

The figure 8 and grooved shapes are made specially so that the surface may be left entirely free of obstruction and all holding or gripping of the trolley wire may be well above the lower surface.

The advantages of figure 8 and grooved trolley wire are defeated due to the necessity of providing holding devices designed to encircle the wire. This, however, has been the construction employed in the past with the devices known as connecters.

The object of my invention is to provide a connecter which will hold the adjacent ends of figure 8 or grooved trolley wire in juxtaposition and at the same time leave the lower and side surfaces which are engaged by a moving current collector entirely free of obstructions and without danger of the pull on the wire forcing the wire out of the splicer in a transverse direction.

Due to the rather slight hold which it is possible to secure upon a grooved or figure 8 trolley wire if the splicer is constructed to allow a free and unobstructed lower surface to the wire, the pressure at right angles to the axis of the trolley wire exerted by the present day holding means of the connecter is sufficient to force the wire out of engagement with the lips of the splicer before the gripping mechanism has attained a sufficient bite upon the trolley wire to keep it from slipping or moving longitudinally or shortly after installation due to the pull upon the wire.

In my invention I have found that by proper relation of the set screw to the trolley wire that it is possible to relieve the trolley wire of the vertical pressure thereon tending to force the wire from the splicer in seating the set screw upon the trolley wire when the trolley wire is under tension and at the same time the tension in the trolley wire does not exert any downward pressure upon the wire tending to force it from the lips of the splicer.

My invention resides in the new and novel construction, combination and relation of the parts hereinafter described and shown in the drawing.

In the drawing:—

Fig. 1 is a side view of my invention with the adjacent ends of the trolley wire in position.

Fig. 2 is an end view of Fig. 1.

Fig. 3 is an enlargement of the splicer, set screw or holding mechanism and trolley wire, together with a diagram of forces.

Fig. 4 is an enlarged view of the present-day splicer, set screw and trolley wire.

My invention comprises an elongated body member 1 which may be of ferrous or non-ferrous metal, as desired. It is provided with a longitudinal groove 2 to receive the trolley wire ends 3 and 4, the longitudinal axis of which is represented by the line $xy$. The holding mechanism which I employ are the set screws 5, the axes of which are angularly disposed to the axis $xy$ of the trolley wire. There may be one or more set screws employed, depending upon the size of wire and the ultimate stress which the wires must withstand.

I use a set screw of the cupped type and not of the pointed type and it may be said to have a cutting edge 6 which through pressure and simultaneous rotation therewith will bite or cut its way into the trolley wire with more or less effort, depending upon the angle which the axis of the screw makes with the axis $xy$ of the wire.

The axis of the set screw 5 which may be represented by the line $oa$ is disposed to the axis $xy$ at such angle that the face 8 adjacent the cutting edge 6 and which bites into the wire will present practically a surface vertical to the axis $xy$. With such a condition I find that the longitudinal pull on the trolley wire will practically eliminate the vertical pressure due to application of the screw into engagement with the wire and will not offer any vertical component force tending to force the wire from the splicer body, therefore all the longitudinal force between the trolley wire and the set screw under normal operation will be purely a holding force to prevent slippage or movement of the trolley wire in a longitudinal direction.

In Fig. 4, I have shown the relation of the parts in the ordinary type of splicer construction with the axis of the set screw at right angles to the axis $xy$ of the trolley wire. In this case when the screw 5 is applied by the operator to secure a grip on the wire 4 there will be a vertical force downward acting upon the surfaces 9, 10, 11 and 12 and also a horizontal component of this force due to the surfaces 9, 10, 11 and 12. It will be apparent, however, that the horizontal force created by the surfaces 9 and 10 will be equal and opposite in direction and likewise the horizontal force due to the surfaces 11 and 12 will be equal and opposite in direction, therefore the horizontal force will be zero and substantially the entire force due to engaging the screw 5 with the trolley wire will be a vertical force downwardly tending to force the trolley wire out of the jaws 13 of the splicer.

If now a longitudinal force is applied to the trolley wires tending to pull them out of a splicer and separate the adjacent ends, it will be apparent from Fig. 4 that if such force is represented by the line $oi$ and in the direction indicated by the arrow, that the vertical forces on the surfaces 9 and 12 will be relieved or very materially reduced and the force $oi$ will act upon the surfaces 10 and 11. The angularity of the faces 10 and 11 will cause a resultant force $oh$ and a vertical force $ih$ tending to force the trolley wire out of the lips of the splicer. If the longitudinal force on the trolley wire is represented by the line $oi$, then the ratio of the downward force to the longitudinal or horizontal force would be the ratio of $oi$ to $ih$. The angularity of the line $oh$ is found, by completing the parallelogram $oegf$—$oe$ and $of$ will be normal to the lines 9 and 12 respectively.

Referring to Fig. 3, when the set screw 5 is applied to grip the wire 4, if the force in axial direction is represented by the line $oa$, there will be a force normal to the surfaces 13 and 14 represented by $oc$ and if we resolve this force into its vertical and horizontal component, we will have a horizontal component of $cd$ and a vertical component tending to force the wire from the splicer, represented by $ob$. If now a longitudinal force is applied to the wire tending to remove it lengthwise from the splicer, it will be evident that the downward pressure $ob$ and the horizontal pressure $bc$ will be entirely eliminated or substantially so and the longitudinal force represented by the line $od$ will be entirely used in maintaining the grip between the trolley wire and the face 8 of the screw 5, as there will be no vertical component tending to force the wire from the splicer body due to the gripping face 8 of the screw being vertical or normal to the force represented by the line $od$. This will be true if the screw of Fig. 3 is used with a body having the wire receiving groove open or closed along the bottom side.

The angle which the axis of the screw 5 makes in Fig. 3 may vary, depending upon the curvature of the surface of the cup 7. Having described my invention and its comparison with a holding set screw as usually employed, it will be quite evident that I am able to provide a splicer which will permit the under surface of the trolley wire to be entirely free of encircling encumbrances and with little or no danger of any vertical forces or forces at right angles or normal to the axis of the trolley wire tending to spread the lips 13 of the splicer and permit the wire to be displaced.

I have made tests upon this device and find that with the set screw used in Fig. 3, I am able to subject the wire to its ultimate or breaking strength without disturbing its relation to the splicer other than a slight separation of the adjacent ends of the trolley wire due to the compression of the trolley wire in contact with the set screw and other slight yielding of the parts.

Only a portion of the cutting edge engages with the wire.

It will be evident that as the axis of the set screw is brought nearer to a vertical position and the face 8 is removed from that of a normal position to the axis $xy$ that the resultant forces will approach those shown in Fig. 4.

Having described my invention, I claim:—

1. A trolley wire splicer comprising an elongated body member having a groove provided to receive the ends of adjacent trolley wires and inwardly projecting longitudinally disposed lips to engage with grooves in the trolley wire and permit the surface of the wire below the lips to be unobstructed to the passage of a current collector, a cupped set screw rotatably mounted in each end of the body member to move longitudinally towards the wire when rotated in one direction to interlock with the wire, the inner surface of the cup on the screw adjacent the edge of the cup being normal to the longitudinal axis of the wire.

2. A trolley wire splicer comprising an elongated body member having a wire groove along one edge with oppositely disposed lips extending along the edges of the groove, spaced threaded passages extending through the body and opening into the groove, a cupped set screw positioned in each passage and movable either towards or away from the groove in an axial direction when rotated, the axis of the screw being obliquely disposed to the longitudinal axis of the groove such that the inner surface of the cup adjacent the edge of the cup will be substantially normal to the longitudinal axis of the wire when positioned in the groove.

3. A wire holder comprising a body member having a wire receiving passage, a cupped set screw extending into the body member and projecting into the passage and movable either towards or away from the passage in an axial direction when rotated, the axis of the screw being obliquely disposed to the longitudinal axis of the wire when in position in the passage, the inner face of the cup adjacent the rim of the cup being substantially normal to the said axis of the wire.

4. A wire splicer comprising an elongated body member having a wire receiving means, means to engage the wire to interlock with the wire and arranged to hold the wire in position without exerting a force upon the wire relative to the body member in a direction normal to the axis of the wire when a force in the direction of the axis of the wire tends to separate the wire from the body, the said means comprising a cupped set screw having a stress receiving surface substantially normal to the longitudinal axis of the wire and also having a cutting edge around the rim of the cup to cut into the wire when the screw is rotated with its cutting edge in contact with the wire.

5. A wire splicer comprising an elongated body member having an opening to receive a wire, a cupped set screw rotatably mounted in the body to move axially either towards or away from the opening when rotated, the set screw having a cutting edge to engage the wire and to cut into the same to hold the wire, the axis of the screw being such with respect to the wire that the pressure of the screw normal to the axis of the wire due to the interlocking of the screw with the wire will be reduced when a stress upon the wire in an axial direction tends to remove the wire from the body member.

6. A trolley wire device comprising in combination a body member provided with a slot to receive a wire, a cupped set screw mounted in the body member to move in an axial direction only when rotated and to interlock with the wire, the axis of the screw being such relative to the longitudinal axis of the wire that a stress upon the wire in an axial direction tending to withdraw the wire from the slot against the holding action of the screw will produce substantially no component force in a direction normal to the axis of the wire.

7. A wire splicer comprising a body member having means to receive a wire in slidable relation to the body member, a cupped set screw with a cutting edge and having its cupped end projecting into said means and cut into the wire to interlock therewith, the inner surface of the cup adjacent the said edge being normal to the axis of the wire.

8. A wire splicer comprising an elongated body member having means to receive a wire in slidable relation to the body member, a cupped set screw with a cutting edge and having its cutting edge project into said means and cut into the wire to interlock therewith and prevent withdrawal of the wire in its axial direction, the axis of the screw being so inclined to the axis of the wire that the screw will interlock with the wire along a portion only of the cutting edge.

9. A wire splicer comprising an elongated body member having longitudinal means to receive the ends of wires to be spliced and spaced longitudinal ridges projecting into said means to interengage with grooves in the wires, a cupped set screw having a cutting edge to engage with each wire and having a threaded engagement with the body member and to move axially when rotated into engagement with the wire to prevent withdrawal of the wire, the axis of the screw being inclined to the longitudinal axis of the wire it engages and the cutting edge of the screw to one side of the screw axis only engageable with the wire, the opposite cutting edge being out of contact with the wire.

10. A splicing ear comprising a body member having a longitudinal wire receiving groove along one edge, openings along the body member, axially movable holding means positioned in the openings and projectable at will into the groove and to make an interlocking engagement with the wire in the groove, the axis of the holding means being obliquely disposed to the longitudinal axis of the groove, the contact between the screw and wire being such that an axial pull on the wire against the set screw will produce substantially no component force at right angles to the wire.

11. A wire holding device comprising in combination a body member having an opening to receive a wire, a second opening having its axis obliquely disposed to the axis of the wire, a set screw immovably mounted in the second opening except for axial movement when rotated, the end faces of the set screw engaging the wire to hold against withdrawal, the angle of the screw axis to the axis of the wire and the angle of the engaging faces with the wire being such that the pull on the wire in an axial direction will result in substantially no force in a direction normal to the wire axis and reduce the screw pressure on the wire due to the interlocking of the screw with the wire.

12. A wire holding device comprising in combination a body member having an opening to receive a wire, a cupped set screw immovably mounted in a second opening in the body except for axial movement when the screw is rotated and having its cupped end projectable into the opening to engage and interlock with the wire, the axis of the screw being inclined to the axis of the wire at an angle of less than 90 degrees.

In testimony whereof I affix my signature.

HOMER P. CHANDLER.